United States Patent [19]

Brown et al.

[11] 4,260,421

[45] Apr. 7, 1981

[54] CEMENT PRODUCTION FROM COAL CONVERSION RESIDUES

[75] Inventors: Leo D. Brown, Baytown, Tex.; James M. Eakman, Morristown, N.J.; Nicholas C. Nahas; LeRoy R. Clavenna, both of Baytown, Tex.

[73] Assignee: Exxon Research & Engineering Co., Florham Park, N.J.

[21] Appl. No.: 41,271

[22] Filed: May 18, 1979

[51] Int. Cl.³ .............................................. C04B 7/24
[52] U.S. Cl. .................................................... 106/103
[58] Field of Search .............................. 106/103, 100

[56] References Cited

U.S. PATENT DOCUMENTS

| 4,022,629 | 5/1977 | Garrett et al. | 106/103 |
| 4,081,285 | 3/1978 | Pennell | 106/103 |
| 4,157,246 | 6/1979 | Eakman et al. | 48/197 R |

Primary Examiner—James Poer
Attorney, Agent, or Firm—Yale S. Finkle

[57] ABSTRACT

Cement is produced by feeding residue solids containing carbonaceous material and ash constituents obtained from converting a carbonaceous feed material into liquids and/or gases into a cement-making zone and burning the carbon in the residue solids to supply at least a portion of the energy required to convert the solids into cement.

10 Claims, 1 Drawing Figure

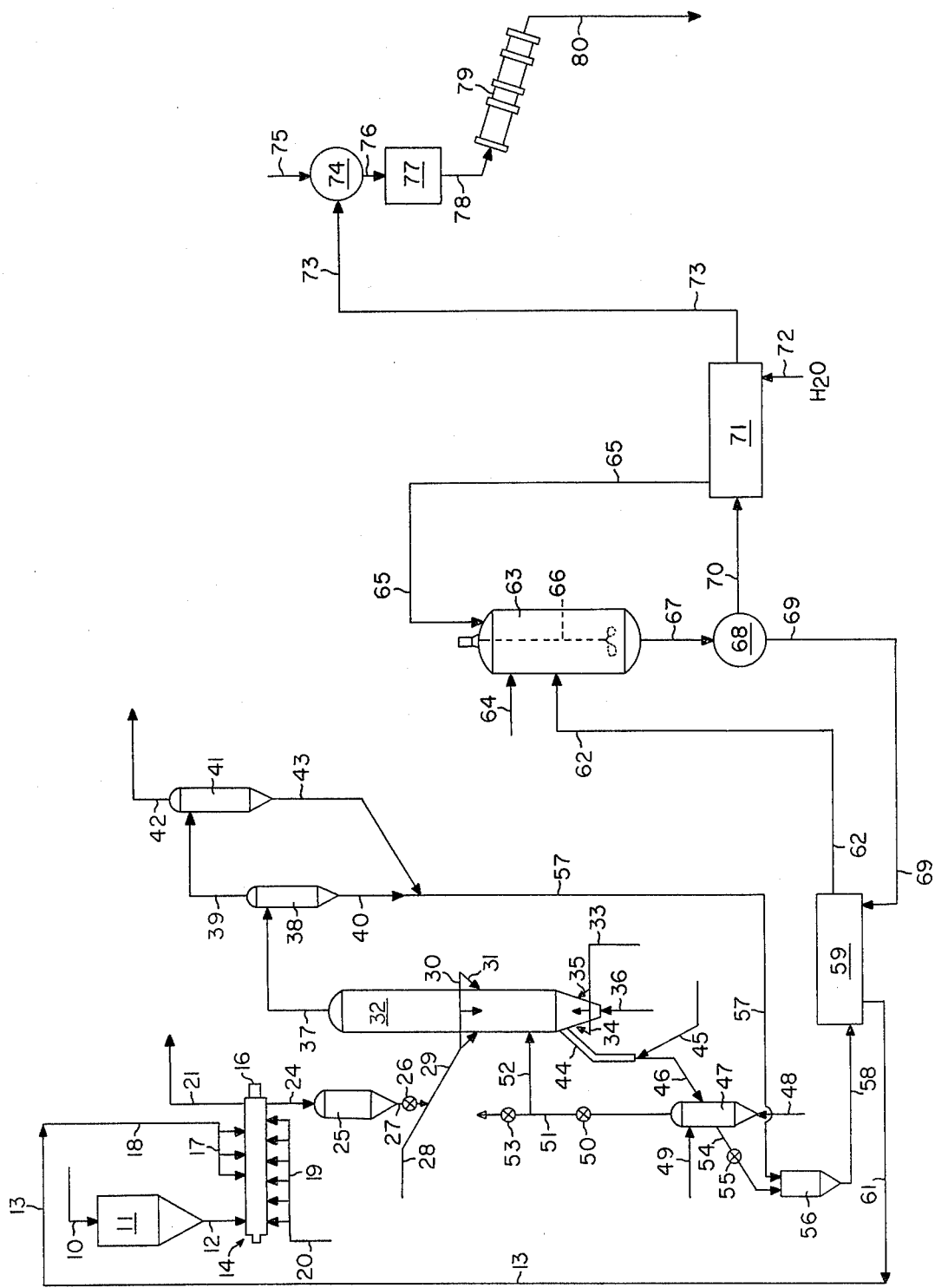

CEMENT PRODUCTION FROM COAL CONVERSION RESIDUES

BACKGROUND OF THE INVENTION

This invention relates to the production of cement and is particularly concerned with using spent solids produced during coal gasification and similar coal conversion operations to manufacture cement.

Catalytic and noncatalytic coal gasification processes and similar operations carried out at high temperatures generally result in the formation of chars. The chars normally include unconverted carbonaceous constituents of the coal or other feed material and various inorganic constituents generally referred to as ash. It is generally advisable to withdraw a portion of the char from the reaction zone during gasification and similar operations in order to eliminate the ash and prevent it from building up within the reaction zone or other vessels in the system. The amount of char removed will normally be quite large, over 20 weight percent of the feed in some instances, and therefore creates disposal problems.

In gasification and similar processes carried out in the presence of an alkali metal-containing catalyst, the resultant chars will contain alkali metal residues along with unconverted carbonaceous constituents and ash. In order to maintain catalyst cost at a reasonable level, it is essential that the alkali metal constituents be recovered from the char residue and reused in the process. There have been proposals for the recovery of alkali metal constituents by water leaching the char after it is withdrawn from the reaction zone and before it is sent to disposal. Such a procedure, however, only recovers the water-soluble alkali metal constituents. It has recently been found that increased amounts of alkali metal constituents can be effectively recovered from the char particles by treating the particles with calcium hydroxide in the presence of water at elevated temperatures and pressures. The calcium ions from the calcium hydroxide evidently react with the alkali metal aluminosilicates and other water-insoluble alkali metal compounds in the char particles thereby liberating alkali metal constituents which dissolve in the water to form an aqueous solution which is recycled to the reaction zone. The spent solids resulting from this treatment step must then be disposed of as waste material.

Regardless of whether a coal gasification process or similar coal conversion operation is carried out in the presence or absence of a catalyst, the spent solids withdrawn from the reaction zone must be disposed of in some manner. In the case of catalytic gasification, the spent solids will contain catalyst residues and may be further treated to recover catalyst constituents. However, spent solids containing carbonaceous material, ash and other constituents will remain after the catalyst recovery step and must be disposed of in a fashion similar to those produced in noncatalytic processes which do not employ catalyst recovery steps. Normally, the spent solids referred to above are transported from the process site to a dump area where they are used as landfill. Disposal in this manner is expensive since the quantity of the spent residue solids will be relatively large, and therefore transportation and other logistics will be complicated. Moreover, the composition of the residue solids may pose environmental problems that could add considerably to the cost of disposal. Thus, disposal of the waste solids is a significant factor in determining the overall cost of the conversion process and no benefit is gained by throwing away these materials, especially in view of the fact that the energy content of the carbon present is lost to the process.

SUMMARY OF THE INVENTION

The present invention provides a process for the manufacture of cement which at least in part alleviates the difficulties described above. In accordance with the invention, it has now been found that the spent solids containing carbonaceous material, ash and other constituents that are produced during coal gasification and similar conversion processes can be effectively disposed of while at the same time producing a valuable by-product by using the solids as feed to a cement-making process. Such solids are especially suited as cement-forming materials since they will normally contain calcareous, siliceous and argillaceous materials in addition to relatively large amounts of unconverted carbonaceous material which is burned in the cement-making zone to supply at least a portion of the energy required to convert the solids into cement. The solids will normally contain greater than about 10 weight percent carbonaceous material on a dry basis and will preferably contain between about 20 to about 60 weight percent carbonaceous material. In some cases the carbonaceous content may be large enough to supply substantially all of the energy required to convert the solids into cement without the need to add an external carbon source for use as fuel. If the amount of calcareous and siliceous materials in the solids is insufficient to meet the desired cement specifications, it may be necessary to add supplementary calcium and silica prior to injecting the solids into the cement-making zone.

Although the process of the invention is applicable to any residue solids containing carbonaceous material and ash constituents produced during a process in which a feed material is converted into gaseous and/or liquid products, the process is particularly applicable to conversion residues which contain a relatively large amount of calcium. A large amount of calcium may be present because the feed material is a low rank coal which naturally contains calcium, the conversion process is carried out in the presence of an added calcium-containing material which serves as a catalyst, or the spent solids from the conversion process are treated with a calcium-containing compound to facilitate the recovery of catalyst constituents. The latter case will exist when a carbonaceous feed material is gasified in the presence of an alkali metal-containing catalyst and the spent solids containing carbonaceous material, ash constituents and alkali metal residues are treated with calcium hydroxide in the presence of water at temperatures between about 250° F. and 700° F. to convert the water-insoluble alkali metal constituents into water-soluble alkali metal constituents, which are recovered and reused as catalyst constituents in the gasification process. The residue solids exiting this treatment step will contain carbonaceous material, calcium-containing inorganic constituents and other inorganic compounds and are particularly suited for use as feed to a cement-making process since they contain calcium silicates and calcium aluminosilicates and therefore less energy is required to convert these solids to cement than would be required with conventional cement feedstocks such as limestone and sand.

The process of the invention provides an economically and environmentally acceptable method of disposing of coal conversion residues while at the same time efficiently producing valuable cement in a manner which advantageously utilizes the unique components of the conversion residues to supply at least a portion of the energy required to produce the cement.

BRIEF DESCRIPTION OF THE DRAWING

The drawing is a schematic flow diagram of a catalytic coal gasification process in which alkali metal constituents of the catalyst are recovered and reused in the process, and the residue solids from the catalyst recovery step are used as feed for the manufacture of cement.

DESCRIPTION OF THE PREFERRED EMBODIMENTS

The process depicted in the drawing is one for the production of methane by the gasification of a bituminous coal, subbituminous coal, lignite or similar carbonaceous solids with steam at high temperature in the presence of a carbon-alkali metal catalyst prepared by impregnating the feed solids with a solution of an alkali metal compound or a mixture of such compounds and thereafter heating the impregnated material to a temperature sufficient to produce an interaction between the alkali metal and carbon present. The spent solids exiting the gasification zone are treated with calcium hydroxide in the presence of water in order to convert water-insoluble alkali metal compounds in the solids into water-soluble alkali metal constituents which are recovered and reused as a portion of the gasification catalyst. The residue solids from the catalyst recovery step are then fed to a cement-making zone where the carbon in the solids is utilized to produce at least a portion of the energy required to convert the residue solids into cement clinker. It will be understood that the feed to the cement manufacturing system disclosed is not restricted to the residue solids exiting the catalyst recovery step of this process and can be the spent solids produced in any of a variety of other conversion processes in which steam, hydrogen, oxygen or the like react with carbonaceous feed materials to produce a char, coke or similar solid product containing carbonaceous materials and inorganic ash constituents, regardless of whether such char is subjected to a catalyst recovery step. The feed can be, for example, the residues from processes for the gasification of coal, petroleum coke, lignite, organic waste materials and similar solids feed streams which produce spent carbonaceous solids. Other conversion processes which yield spent solids which may be used include operations for the pyrolysis of coal and similar feed solids, for the liquefaction of coal and related carbonaceous materials, for the partial combustion of carbonaceous feed materials, and the like. Such processes have been disclosed in the literature and will be familiar to those skilled in the art.

In the process depicted in the drawing, a solid carbonaceous feed material such as bituminous coal, subbituminous coal, lignite or the like that has been crushed to a particle size of about 8 mesh or smaller on the U.S. Sieve Series Scale is passed into line 10 from a feed preparation plant or storage facility that is not shown in the drawing. The solids introduced into line 10 are fed into a hopper or similar vessel 11 from which they are passed through line 12 into feed preparation zone 14. This zone contains a screw conveyer or similar device, not shown in the drawing, that is powered by a motor 16, a series of spray nozzles or similar devices 17 for the spraying of alkali metal-containing solution supplied through line 18 onto the solids as they are moved through the preparation zone by the conveyor, and a similar set of nozzles or the like 19 for the introduction of steam into the preparation zone. The steam, supplied through line 20, serves to heat the impregnated solids and drive off the moisture. Steam is withdrawn from zone 14 through line 21 and passed to a condenser, not shown, from which it may be recovered for use as makeup water or the like. The alkali metal-containing solution is recycled through lines 61 and 13 from the alkali metal recovery section of the process, which is described in detail hereafter.

It is preferred that sufficient alkali metal-containing solution be introduced into feed preparation zone 14 to provide from about 1 to about 50 weight percent of the alkali metal compound or mixture of such compounds on the coal or other carbonaceous solids. From about 1 to about 15 weight percent is generally adequate. The dried impregnated solid particles prepared in zone 14 are withdrawn through line 24 and passed to a closed hopper or similar vessel 25. From here they are discharged through a starwheel feeder or equivalent device 26 in line 27 at an elevated pressure sufficient to permit their entrainment into a stream of high pressure steam, recycle product gas, inert gas or other carrier gas introduced into line 29 via line 28. The carrier gas and entrained solids are passed through line 29 into manifold 30 and fed from the manifold through feedlines 31 and nozzles, not shown in the drawing, into gasifier 32. In lieu of or in addition to hopper 25 and starwheel feeder 26, the feed system may employ parallel lock hoppers, pressurized hoppers, aerated standpipes operated in series, or other apparatus to raise the input feed solids stream to the required pressure level.

It is generally preferred to operate the gasifier 32 at a pressure between about 100 and about 2000 psig. The carrier gas and entrained solids will normally be introduced at a pressure somewhat in excess of the gasifier operating pressure. The carrier gas may be preheated to a temperature in excess of about 300° F. but below the initial softening point of the coal or other feed material employed. Feed particles may be suspended in the carrier gas in a concentration between about 0.2 and about 5.0 pounds of solid feed material per pound of carrier gas. The optimum ratio for a particular system will depend in part upon feed particle size and density, the molecular weight of the gas employed, the temperature of the solid feed material and input gas stream, the amount of alkali metal compound employed and other factors. In general, ratios between about 0.5 and about 4.0 pounds of solid feed material per pound of carrier gas are preferred.

Gasifier 32 comprises a refractory lined vessel containing a fluidized bed of carbonaceous solids extending upward within the vessel above an internal grid or similar distribution device not shown in the drawing. The bed is maintained in the fluidized state by means of steam introduced through line 33, manifold 34 and peripherally spaced injection lines and nozzles 35 and by means of recycle hydrogen and carbon monoxide introduced through bottom inlet line 36. The particular injection system shown in the drawing is not critical and hence other methods for injecting the steam and recycle hydrogen and carbon monoxide may be employed. In some instances, for example, it may be preferred to introduce both the steam and recycle gases through multiple nozzles to obtain more uniform distribution of the injected fluid and reduce the possibility of channeling and related problems. The space velocity of the rising gases within the fluidized bed will normally be between about 300 and 3000 volumes of steam and recycle hydrogen and carbon monoxide per hour per volume of fluidized solids.

The injected steam reacts with carbon in the feed material in the fluidized bed in gasifier 32 at a temperature within the range between about 800° F. and about 1600° F. and at a pressure between about 100 and about 2000 psig. A temperature between about 1200° F. and about 1400° F. is normally preferred. Due to the equilibrium conditions existing in the bed as the result of the presence of the carbon-alkali metal catalyst and the recycle hydrogen and carbon monoxide injected near the lower end of the bed, the reaction products will normally consist essentially of methane and carbon dioxide. Competing reactions which in the absence of the catalyst and the recycle gases would ordinarily tend to produce additional hydrogen and carbon monoxide are suppressed. The ratio of methane to carbon dioxide in the raw product gas thus formed will preferably range from about 1 to about 1.4 moles per mole, depending upon the amount of hydrogen and oxygen in the feed coal or other carbonaceous solids. The coal employed may be considered as an oxygenated hydrocarbon for purposes of describing the reaction. Wyodak coal, for example, may be considered as having the approximate formula $CH_{0.84}O_{0.20}$, based on the ultimate analysis of moisture and ash-free coal and neglecting nitrogen and sulfur. The reaction of this coal with steam to produce methane and carbon dioxide is as follows:

$$1.24H_2O(g) + 1.8CH_{0.84}O_{0.20} \rightarrow 0.8CO_2 + CH_4$$

Under the same gasification conditions, coals of higher oxygen content will normally produce lower methane to carbon dioxide ratios and those of lower oxygen content will yield higher methane to carbon dioxide ratios.

The gas leaving the fluidized bed in gasifier 32 passes through the upper section of the gasifier, which serves as a disengagement zone where particles too heavy to be entrained by the gas leaving the vessel are returned to the bed. If desired, this disengagement zone may include one or more cyclone separators or the like for removing relatively large particles from the gas. The gas withdrawn from the upper part of the gasifier through line 37 will normally contain methane and carbon dioxide produced by the reaction of the steam with carbon, hydrogen and carbon monoxide introduced into the gasifier as recycle gas; unreacted steam; hydrogen sulfide; ammonia and other contaminants formed from the sulfur and nitrogen contained in the feed material; and entrained fines. This gas is introduced into cyclone separator or similar device 38 for removal of the larger fines. The overhead gas then passes through line 39 into a second separator 41 where smaller particles are removed. The gas from which the solids have been separated is taken overhead from separator 41 through line 42 and the fines are discharged downward through dip legs 40 and 43. These fines may be returned to the gasifier or passed to the alkali metal recovery section of the process as discussed hereafter.

After entrained solids have been separated from the raw product gases described above, the gas stream may be passed through suitable heat exchange equipment for the recovery of heat and then processed for the removal of acid gases. Once this has been accomplished the remaining gas, consisting primarily of methane, hydrogen and carbon monoxide, may be cryogenically separated into a product methane stream and a recycle stream of hydrogen and carbon monoxide, which is returned to the gasifier through line 36. Conventional gas processing equipment can be used. Since a detailed description of this downstream gas processing portion of the process is not necessary for an understanding of the invention, it has been omitted.

The fluidized bed in gasifier 32 is comprised of char particles formed as the solid carbonaceous feed material undergoes gasification. The composition of the char particles will depend upon the amount of mineral matter present in the carbonaceous material fed to the gasifier, the amount of the alkali metal compound or mixture of such compound inpregnated into the feed material, and the degree of gasification that the char particles undergo while in the fluidized bed. The lighter char particles, which will have a relatively high content of carbonaceous material, will tend to remain in the upper portion of the fluidized bed. The heavier char particles, which will contain a relatively small amount of carbonaceous material and a relatively large amount of ash and alkali metal residues will tend to migrate toward the bottom of the fluidized bed. A portion of the heavier char particles are normally withdrawn from the bottom portion of the fluidized bed in order to eliminate ash and thereby prevent it from building up within the gasifier and other vessels in the system.

During the gasification process, alkali metal constituents of the gasification catalyst react with the mineral constituents of the coal and other carbonaceous solids. Studies have indicated that at least a portion of the alkali metal compounds, such as potassium carbonate, potassium hydroxide and the like, that are used as gasification catalyst constituents react with the aluminosilicates and other ash constituents to form alkali metal residues containing water soluble alkali metal compounds such as carbonates, sulfates, sulfides and the like and catalytically inactive materials such as alkali metal aluminosilicates, alkali metal iron sulfides and other water-insoluble compounds. A significant amount of the potassium carbonate or other alkali metal compound employed to impregnate coal or similar feed material prior to gasification will react with the aluminosilicates and other ash constituents during gasification to form alkali metal aluminsolicates, alkali metal iron sulfides and other water-insoluble catalyst residues which cannot normally be recovered from the ash by water washing. When potassium carbonate is utilized to impregnate the coal, one of the major constituents of the water-insoluble alkali metal residues produced is a synthetic kaliophilite, which has the chemical formula $KAl SiO_4$. To improve the economics of the catalytic gasification process described above and other catalytic conversion processes where water-insoluble alkali metal residues are formed, it is desirable to recover as much as possible of the alkali metal constituents from the insoluble residues and reuse them as catalyst constituents in the conversion process, thereby decreasing the amount of costly makeup alkali metal compounds needed.

Referring again to the drawing, char particles containing carbonaceous material, ash or inorganic constituents and alkali metal residues are continuously withdrawn through line 44 from the bottom of the fluidized bed in gasifier 32. The particles flow downward through line 44 countercurrent to a stream of steam or other elutriating gas introduced through line 45. Here, a preliminary separation of solids based on differences in size and density takes place. The lighter particles having a relatively large amount of carbonaceous material tend to be returned to the gasifier and the heavier particles having a relatively high content of ash and alkali metal residues continue downward through line 46 into fluidized bed withdrawal zone 47. Steam or other fluidizing gas is introduced into the bottom of the withdrawal zone through line 48 to maintain the bed in a fluidized state. Water may be introduced through line 49 in order to cool the particles and facilitate their further processing. The withdrawal rate is controlled by regulating the pressure within zone 47 by means of a throttle valve 50 in overhead line 51. The gases from line 51 may be returned to the gasifier through line 52 or vented through valve 53. The solid particles in vessel 47 are now ready for treatment to recover alkali metal constituents from the alkali metal residues.

The solid particles in vessel 47 are passed through line 54 containing pressure letdown valve 55 into hopper 56 where they are combined with char fines recovered from the raw product gas through diplegs 40 and 43, and line 57. The particles in the hopper are then passed through line 58 into wash zone 59 where they are contacted with an aqueous solution containing water-soluble alkali metal constituents injected into the wash zone through line 69. The production of this aqueous solution is described in detail hereafter. During the contacting process which takes place in wash zone 59, a portion of the water-soluble constituents present in the alkali metal residues will dissolve in the solution thereby further enriching it in alkali metal constituents. The wash zone will normally comprise a single or multistage countercurrent extraction system in which the particles are countercurrently contacted with the aqueous solution introduced through line 69.

An aqueous solution enriched in alkali metal constituents is withdrawn from wash zone 59 and passed through lines 61, 13 and 18 to feed preparation zone 14. Here, the coal or similar carbonaceous feed material is impregnated with the alkali metal constituents in the aqueous solution. If the concentration of alkali metal consitutents in the recycle solution is undesirably low, the solution may be concentrated by removing excess water before it is returned to the feed preparation zone. In lieu of recycling the solution in line 61 to the feed preparation zone, alkali metal constituents can be separated from the concentrated solution by evaporation and crystallization, precipitation or other method, and added to the feed material in solid form.

The aqueous slurry containing char particles depleted in water-soluble alkali metal constituents exiting wash zone 59 is passed through line 62 into autoclave or similar reaction vessel 63, which is equipped with stirrer 66. Here the alkali metal aluminosilicates and other insoluble alkali metal compounds in the char particles react, in the presence of a basic aqueous solution, with a calcium-containing compound introduced into the reactor through line 64 to form water-soluble alkali metal constituents and water-insoluble compounds. The primary source of the basic aqeous solution that serves as the medium for the conversion of the water-insoluble alkali metal residues into water-soluble constituents is an alkaline recycle solution introduced into autoclave 63 through line 65. The production of this alkaline solution, which will normally contain an alkali metal hydroxide having the same cation as the alkali metal compound originally used to impregnate the feed coal and other basic water-soluble alkali metal constituents, is described hereafter. The conversion of water-insoluble alkali metal compounds into water-soluble alkali metal constituents is substantially enhanced if the pH of the slurry in the autoclave is maintained between about 13.0 and 14.5. Stirrer 66 is continually operated during the reaction to at least partially prevent agglomeration of the reactants and to maintain a well dispersed slurry.

The temperature in autoclave 63 will normally be maintained in the range between about 250° F. and about 700° F., preferably in the range about 250° F. and about 450° F. and most preferably at a temperature of about 300° F. Since water must always be present in autoclave 63 in the liquid state to provide the medium for the reactions that take place, the pressure in the autoclave should normally be equal to or greater than the vapor pressure of water at the operating temperature. The residence time in the autoclave will normally be greater than about 30 minutes and will preferably be in the range between about 1.0 hour and 4.0 hours, and will most preferably be about 2.0 hours.

The calcium compound used as one of the reactants in the reactions taking place in the autoclave may be any inorganic or organic calcium-containing compound that at least partially ionizes or dissociates in water to yield calcium ions. The calcium-containing compound may, for example, be calcium oxide, calcium hydroxide, calcium acetate, calcium formate, or the like. Calcium oxide is preferred. The actual calcium-containing compound used will depend primarily upon its availability, cost and degree of solubility in the reaction medium present in the autoclave. The amount of the calcium compound needed will depend in part on the amount of the insoluble alkali metal residues in the particulate matter fed to autoclave 63. If desired, a mixture of two or more calcium compounds may be used in lieu of a single compound.

The actual reactions that take place in the autoclave to convert the water-insoluble compounds in the alkali metal residues into water-soluble alkali metal constituents are not completely understood. Apparently, the calcium compound at least partially dissolves in the slurry water to yield calcium ions that displace or liberate water-soluble alkali metal constituents from the water-insoluble compounds in the alkali metal residues. The liberation of these water-soluble constituents is accompanied by the formation of residue solids composed of various insoluble species. These insoluble species may consist of calcium silicates, aluminates, aluminosilicates and other insoluble compounds, depending upon the types of water-insoluble constituents in the alkali metal residues.

As mentioned previously, when potassium carbonate or potassium hydroxide is utilized as the alkali metal-containing catalyst, one of the major constituents of the water-insoluble alkali metal residues produced is thought to be synethetic kaliophilite, $KAlSiO_4$. When calcium hydroxide is utilized as the calcium-containing compound, the following reactions are believed to take place in autoclave 63.

$$3Ca(OH)_2 + 2KAlSiO_4 \longrightarrow \underset{\text{hydrogarnet}}{Ca_3Al_2SiO_4(OH)_8} + SiO_2 + 2KOH \quad (1)$$

-continued

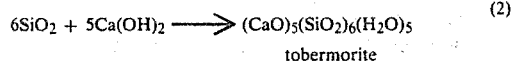
tobermorite

As can be seen from equation (1) above, the calcium hydroxide reacts with the water-insoluble potassium aluminosilicate or kaliophilite to produce water-insoluble hydrogarnet, a calcium aluminum silicate, silica and water-soluble potassium hydroxide. The silica formed by the reaction of equation (1) and other free silica present in the particles fed to the autoclave then react directly with calcium hydroxide, as shown in equation (2), to form water-insoluble tobermorite, a hydrated calcium silicate. In addition to the above-listed equations, calcium hydroxide also reacts with carbonate in the slurry fed to the autoclave to form water-insoluble calcium carbonate. It will be understood that the above-discussed reactions represent only three reactions that may take place in the autoclave. Reactions involving more complicated alkali metal aluminosilicates and other insoluble constituents of the alkali metal residues and ash may also take place to form products other than those shown and discussed above.

The slurry effluent from autoclave 63 is withdrawn through line 67 and passed to rotary filter, hydroclone or other solids-liquid separation device 68 where the aqueous solution containing water-soluble alkali metal constituents is separated from the residue solids, which are comprised of the particulate matter originally fed to autoclave 63 and the water-insoluble compounds formed by the reactions taking place in the autoclave. The aqueous solution is passed through line 69 into wash zone 59 where it is contacted with the particles produced in gasification zone 32 to form the aqueous solution enriched in alkali metal constituents that is recycled to feed preparation zone 14 where the alkali metal constituents present in the solution, which include substantially all of the water-soluble alkali metal constituents produced from the water-insoluble alkali metal residues in autoclave 63, are used as at least a portion of the alkali metal constituents comprising the alkali metal-containing catalyst.

The residue solids removed from separation device 68 through line 70 will contain entrained liquid containing water-soluble alkali metal constituents. These alkali metal constituents are recovered by passing the residue solids into extraction zone 71 where they are contacted with water introduced into the zone through line 72. During contact in the extraction zone, the water removes the majority of the entrained liquid containing alkali metal constituents. An aqueous solution containing water-soluble alkali metal constituents is recovered from the extraction zone through line 65 and recycled to autoclave 63 where it provides the basic aqueous solution that serves as the medium for the conversion of water-insoluble alkali metal residues into water-soluble alkali metal constituents. Extraction zone 71 will normally be a multistage countercurrent water extraction unit which includes a plurality of tanks or vats, classifiers, screw-fed contactors, thickeners, continuous centrifuges or the like. The number of actual stages employed in the extraction system will depend to a large extent upon the composition of the solids fed to the system and the particular contacting conditions utilized.

The solids depleted in water-soluble alkali metal constituents withdrawn from extraction zone 71 through line 73 will normally contain, among other substances, water, carbonaceous material, ash constituents, and various types of calcium silicates. If potassium carbonate or hydroxide is utilized as the alkali metal-containing catalyst and the reactions set forth in equations (1) and (2) above take place, the residue solids will contain calcium aluminum silicate and hydrated calcium silicate along with a certain amount of calcium carbonate. Normally the residue solids will contain between about 20 weight percent and about 60 weight percent carbonaceous material on a dry basis with the remainder being inorganic constituents. The composition on an ignited basis of a typical residue obtained from the calcium hydroxide treatment of char particles produced by gasifying an Illinois No. 6 coal impregnated with potassium carbonate or hydroxide is set forth below.

TABLE I

| COMPOUND | WT %, DRY ASH |
|---|---|
| CaO | 51.3 |
| K$_2$O | 3.8 |
| Al$_2$O$_3$ | 7.1 |
| SiO$_2$ | 19.3 |
| P$_2$O$_5$ | 0.2 |
| MgO | 0.8 |
| Na$_2$O | 0.5 |
| Fe$_2$O$_3$ | 9.7 |
| SO$_3$ | 4.7 |
| TiO$_2$ | 0.5 |

Normally, the residue solids exiting the water extraction zone of this particular gasification process and the residue solids from other noncatalytic or catalytic conversion processes, whether or not a catalyst recovery step is utilized, are disposed of as landfill. Since at least about 20 weight percent of the coal or other carbonaceous feed material will end up as residue that must be disposed of, this method of disposal is not only expensive but may be difficult to achieve. Furthermore, since the residue contains a high percentage of uniformly dispersed carbonaceous material, a potential source of energy is being discarded with the residue. It has now been found that these conversion residues are ideally suited for use as feed to cement manufacturing processes. The residues contain the inorganic materials that are normally required to make cement and in addition contain carbon which can be combusted in the cement-making zone to supply at least a portion of the energy required to convert the residue solids into cement. The residue solids produced in the process depicted in the drawing and described above are particularly suited as feed to cement-making processes since they contain a large amount of calcium in addition to other necessary inorganic constituents. Moreover, a high percentage of the calcium is already combined with other ash elements in the form of calcium silicates and calcium aluminosilicates that are similar to the compounds normally formed in the cement-making zone. In general, the residue solids exiting the water extraction zone will contain at least 10 weight percent calcium silicates and calcium aluminosilicates on a dry basis. Since these compounds already exist when the residue solids are fed into the cement-making zone, the energy required to convert the solids into cement is greatly reduced. In some cases the carbonaceous content of the residue solids may be large enough to supply substantially all of the energy required and the use of an external fuel source may not be necessary.

Referring again to the drawing, the residue solids withdrawn from extraction zone 71 through line 73 are passed to mixing zone 74 where they are combined with supplementary calcium and silica introduced into the mixing zone through line 75. The amount of calcium and silica that is added will depend in part upon the composition of cement desired and the makeup of the residue solids. The makeup of the residue solids in turn will depend upon the type of carbonaceous feed material that is gasified and the alkali metal-containing catalyst utilized. The supplementary calcium and silica is normally added in the form of calcium carbonate and sand. If desired, however, other calcium-containing and silica-containing materials may be used. In some cases other materials may be added to give the cement desired properties.

The solids in mixing zone 74 are withdrawn through line 76 and are now ready to be converted into cement. The particles are passed through line 76 into preheater or precalciner zone 77. Here the carbonaceous material in the solids is burned to provide the energy necessary to dry, decarbonate any calcium carbonate present, and heat the particles to a sufficiently high temperature to begin the chemical reactions that lead to the production of cement. Normally, all of the carbonaceous material is combusted in the precalciner. The temperature in the precalciner is normally maintained in the range between about 130° F. and about 1800° F. If the carbonaceous material present in the feed to the precalciner is not sufficient to supply all the energy necessary, it may be necessary to pass the hot exhaust gases from rotary kiln 79 into the precalciner to provide the necessary makeup heat.

The heated particles from precalciner 77 are withdrawn through line 78 and passed to rotary kiln or similar device 79. Here the particles are subjected to temperatures in the range between about 1700° F. and about 2700° F. in order to sinter the solids and convert them into cement clinker. The energy required in the rotary kiln is normally supplied by burning a supplementary fuel such as coal or gas that is introduced into the opposite end of the kiln. If however, all of the carbonaceous material in the solids originally fed to mixer 74 is not combusted in the precalciner, the remainder may be burned in the rotary kiln to reduce or eliminate the need for supplementary fuel. Furthermore, since the residue solids exiting water extraction zone 71 already contain calcium silicates and calcium aluminosilicates, the energy normally required to make cement is greatly reduced. The cement clinker exiting rotary kiln 79 is withdrawn through line 80, cooled and further processed to make conventional cement such as portland cement.

The precalciner 77 and rotary kiln 79 described above, comprise the cement-making zone of the process. It will be understood, however, that the cement-making zone is not limited to such a combination and may comprise any cement-making process, whether comprised of multiple or single stages, in which the carbonaceous material in the residue feed is burned to supply all or a portion of the energy required to convert the residue to cement. For example, the cement-making zone may be comprised of a fluid bed combustor, a cyclone combustor or any similar type furnace.

In the embodiment of the invention shown in the drawing and described above, the residue solids fed to the cement-making zone are produced by treating char particles obtained by gasifying a carbonaceous feed material in the presence of an alkali metal-containing catalyst with a calcium-containing compound in the presence of water. It will be understood that the process of the invention is not limited to such residue solids and is equally applicable to the use of solids that have not been so treated and to solids which have not been produced by gasification in the presence of an alkali metal-containing catalyst. For example, the process of the invention is applicable to the particles containing carbonaceous material produced from the noncatalytic gasification of coal or a similar carbonaceous feed material as well as to particles containing carbonaceous material produced during the gasification of a carbonaceous feed material in the presence of a calcium-containing compound. In the latter case the residue solids will be particularly suitable for feed to a cement-making process since they will already contain a high amount of calcium already reacted with inorganic constituents of the ash to form calcium silicates and calcium aluminosilicates. In processes which do not use a catalyst recovery step, the solids produced during gasification will normally be dry and can be used in the semi-wet or semi-dry processes for producing cement as described in U.S. Pat. No. 4,081,285, which is hereby incorporated by reference.

It will be apparent from the foregoing that the process of the invention provides a cement manufacturing process which eliminates the high cost and environmental problems associated with the disposal of residues produced during the noncatalytic or catalytic conversion of carbonaceous feed materials into gases and/or liquids and at the same time decreases the amount of energy required to produce the cement. As a result, the overall cost of the conversion process is significantly reduced.

We claim:

1. A process for the manufacture of cement which comprises:
   (a) passing residue solids containing between about 20 weight percent and about 60 weight percent carbonaceous material with the remainder of said residue solids being inorganic ash constituents including calcium silicates and calcium aluminosilicates into a cement-making zone, said residue solids produced by (1) converting a solid carbonaceous feed material in the presence of an alkali metal-containing catalyst into liquids and/or gases thereby producing particles containing carbonaceous material, inorganic ash constituents and alkali metal residues and (2) treating said particles with a calcium-containing compound in the presence of water at a temperature between about 250° F. and about 700° F. to convert water-insoluble alkali metal constituents in said alkali metal residues into water-soluble alkali metal constituents; and
   (b) combusting said carbonaceous material in said residue solids to supply at least a portion of the energy required to convert said residue solids into cement in said cement-making zone and wherein the presence of said calcium silicates and said calcium aluminosilicates decreases the amount of energy required to convert said residue solids into cement.

2. A process as defined in claim 1 wherein said carbonaceous feed material is converted into liquids by liquefaction.

3. A process as defined in claim 1 wherein said solid carbonaceous feed material comprises coal.

4. A process as defined in claim 1 wherein said cement-making zone comprises a precalciner in combination with a rotary kiln.

5. A process as defined in claim 1 wherein said carbonaceous feed material is converted by gasification in the presence of a potassium-containing catalyst.

6. A process as defined in claim 1 wherein said calcium-containing compound comprises calcium oxide.

7. A process as defined in claim 7 wherein said cement-making zone comprises a precalciner in combination with a rotary kiln and substantially all of said carbonaceous material is combusted in said precalciner to provide substantially all of the energy required to preheat said residue solids prior to their introduction into said rotary kiln.

8. A process as defined in claim 1 wherein said residue solids are contacted with water to remove water-soluble alkali metal constituents prior to passing said solids into said cement-making zone.

9. A process as defined in claim 1 wherein said residue solids containing said carbonaceous material and said inorganic ash constituents are mixed with supplementary calcium and silica prior to their introduction into said cement-making zone.

10. A process as defined in claim 1 wherein the carbonaceous content of said residues solids is sufficient to provide substantially all of the energy required to convert said solids into cement.

* * * * *